March 15, 1927.  W. F. HEROLD  1,620,658
CASTER
Filed Dec. 18, 1925   2 Sheets-Sheet 1
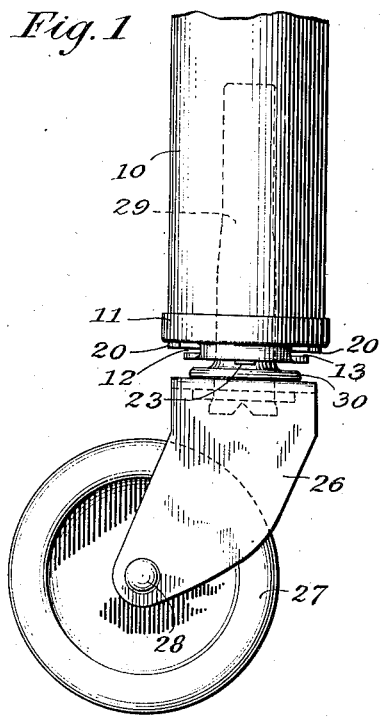
Fig. 1
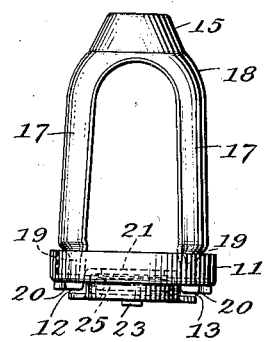
Fig. 2
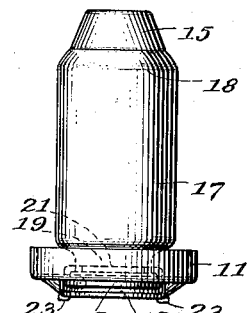
Fig. 3
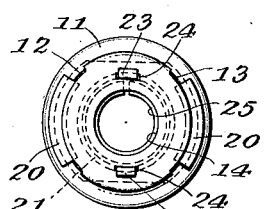
Fig. 4
Fig. 5
Fig. 6
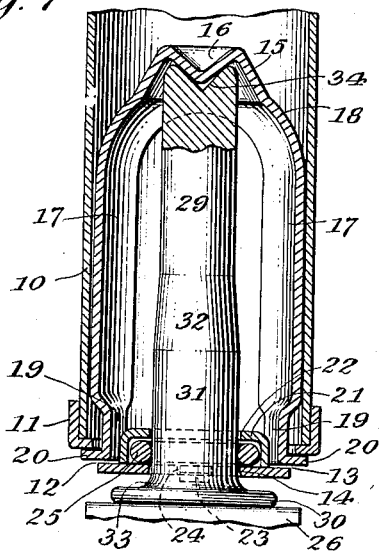
Fig. 7
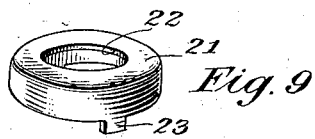
Fig. 9
Fig. 10
Fig. 8
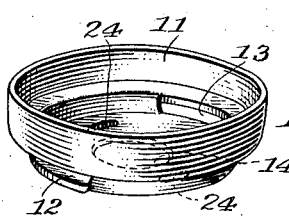
Fig. 11
INVENTOR.
Walter F. Herold
BY
ATTORNEY.

March 15, 1927.  W. F. HEROLD  1,620,658

CASTER

Filed Dec. 18, 1925  2 Sheets-Sheet 2

INVENTOR.
Walter F. Herold
BY
ATTORNEY.

Patented Mar. 15, 1927.

1,620,658

UNITED STATES PATENT OFFICE.

WALTER F. HEROLD, OF UPPER MONTCLAIR, NEW JERSEY, ASSIGNOR TO THE BASSICK COMPANY, OF BRIDGEPORT, CONNECTICUT, A CORPORATION OF CONNECTICUT.

CASTER.

Application filed December 18, 1925. Serial No. 76,229.

The present invention relates to improvements in casters, and particularly in retaining means for removably securing the caster pintle in the caster socket or frame. Heretofore such holding means have consisted in non-rotatable or stationary spring means cooperating between the socket and pintle near or at the top of the pintle, and in constructions employing a spring frame for insertion in the furniture it is usual to attempt to bring the frame into the pintle diameter, so that the holding means can be applied at the top of the pintle. In some forms the pintle was annularly grooved near the top to retain a spring ring which gripped in a mounting socket, while in other forms the spring means was secured or formed on the spring frame or socket and gripped with a grooved or headed structure at the upper end of the pintle. Obviously this necessitated a frame or socket structure designed to accommodate the holding means in addition to its normal function.

It is an object of the present invention, therefore, to provide improved holding means cooperating with the pintle independently of the spring frame or socket, so that the latter may be of any desired size or form, without respect to the pintle shape or diameter. A further object is to provide such means adapted to grip upon the surface of the pintle, and with which a substantially plain pintle, free of grooves, may be employed, such a pintle being adapted for economical production by one operation in a header machine. A further object is to provide a holding means which may be gripped upon the pintle to any desired degree, depending upon the particular use, and at the same time will have no tendency to retard the swiveling of the caster, and further, to provide such means which at no time is called upon to carry any stress due to side motion or side strains, so that the holding means is practically free of wear or deterioration.

With the above and other objects in view, embodiments of the invention are shown in the accompanying drawings, and these embodiments will be hereinafter more fully described with reference thereto, and the invention will be finally pointed out in the claims.

In the drawings:

Fig. 1 is a side elevation showing a tubular metal leg provided with a caster according to one embodiment of the invention;

Fig. 2 is a side elevation of the assembled socket member consisting of the spring frame and leg mount;

Fig. 3 is a side elevation at right angles to that shown in Fig. 2;

Fig. 4 is a bottom plan view of the caster socket;

Fig. 5 is a detail sectional view of the leg mount washer, disassembled;

Fig. 6 is a similar sectional view at right angles to that shown in Fig. 5;

Fig. 7 is a vertical sectional view, enlarged, showing the assembled caster and socket attached to the furniture leg;

Fig. 8 is a similar fragmentary view, showing the manner of inserting the pintle;

Fig. 9 is a perspective view of the spring retaining cup member employed;

Fig. 10 is a perspective view of the pintle retaining spring ring;

Fig. 11 is a perspective view of the leg mount washer;

Similar reference characters indicate corresponding parts throughout the several figures of the drawings.

Figure 12:
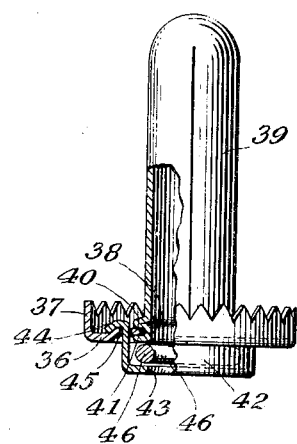
Fig. 12 is a side elevation partly in section of a modified form of the invention, adapted for use with a wood furniture leg.

Referring to the drawings, and more particularly to Figs. 1 to 11 thereof, the caster, according to the embodiment of the invention shown therein, is adapted for attachment to a tubular metal leg or post 10, as shown in Figs. 1 and 7, and comprises a peripherally flanged leg mount washer 11 provided in annularly spaced relation to its flange with diametrically opposed circumferential slits 12 and 13, the portion of the leg mount between said slits being depressed to form said slits into laterally extending slots for securing the spring frame ends, and provided centrally with a pintle receiving opening 14.

The spring frame comprises a truncated cone shaped top portion 15 having a depressed cone shaped center bearing 16, and side legs 17 joined to the top portion by an annular rounded shoulder portion 18, these legs being of circumferential cross section and provided at their lower ends with inwardly offset contracted leg mount engaging portions 19 having laterally extending circumferential end flanges 20 bent outwardly therefrom. The spring frame is assembled with the leg mount by compressing the side legs to a point where the outer edges of the end flanges 20 will pass downwardly past the upper walls of the slots 12 and 13, whereupon they are expanded outwardly through said slots beneath the lateral under surface of the leg mount, the engagement of the portions 19 with said upper walls of the slots limiting the expansion of the spring frame legs to such extent that in the detached position, (Fig. 2) the side legs are inclined outwardly toward their lower ends. In the inserted position within the furniture leg the side legs are contracted so that they engage the inner surface of the leg substantially over their entire outer surface, and exert an outward pressure to firmly retain the caster mounting frame and leg mount, the lower end of the leg 10 being engaged within the peripheral flange of the leg mount. In this attached relation the end flanges 20 extend directly beneath the lower end of the furniture leg.

The pintle retaining means of the invention is carried upon the leg mount 11, and in the present embodiment consists of a cup member 21 having a central pintle receiving opening 22 in line with the opening 14, and secured by projecting ears 23 inserted through slots 24 in the leg mount and bent over upon the under surface thereof. Within the cup there is loosely engaged and retained a split spring ring 25, its inner diameter being smaller than that of the openings 14 and 22 and its outer diameter smaller than the inner diameter of the cup, this spring ring adapted, as will hereinafter more fully appear, to retain the caster pintle frictionally.

The detachable caster consists of the usual horn 26 having a caster wheel 27 rotatably carried therein upon an axle 28, and having a pintle 29 secured in its upper transverse portion, the lower end of the pintle being provided with a flange or shoulder 30 engaging the upper surface of the horn. The pintle is provided at its lower portion with an enlarged diameter cylindrical portion 31, tapering, as at 32, to the upper smaller diameter portion, and between said portion 31 and the shoulder 30 there is preferably formed a rounded fillet surface 33. At the upper end of the pintle there is provided a cone shaped recess 34 adapted to engage the center bearing 16 of the spring frame. The diameter of the pintle is such that the upper portion will pass freely through the spring ring 25, while the lower portion 31 will expand said ring and be thus held thereby against dropping out of the leg, the ring being snugly held about the pintle and freely rotatable within the cup member 21.

In the operative or engaged position of the caster, as shown in Fig. 7, the pintle has thrust bearing upon the center bearing 16 of the spring frame, being held vertically by the leg mount. The spring ring 25 firmly retains it against dropping out, but permits it to rotate freely within the socket without impedance. The ring may have any desired degree of frictional binding engagement upon the pintle, but in any case will have free rotary movement within the leg mount. It is obvious that with the present construction the upper portion of the pintle may have any desired shape or diameter, and that the spring frame may be constructed without regard to such shape or diameter, and particularly it may be formed to engage the furniture leg in the most efficient manner, with a full fit, for instance, as shown in the present embodiment. The pintle being free of any grooves, cut-outs or irregular shapes may be very economically formed. If desired the pintle may be provided with a shallow annular depression at its point of engagement by the spring ring, so that the latter will snap into place and form a yielding locking connection.

Figure 13:
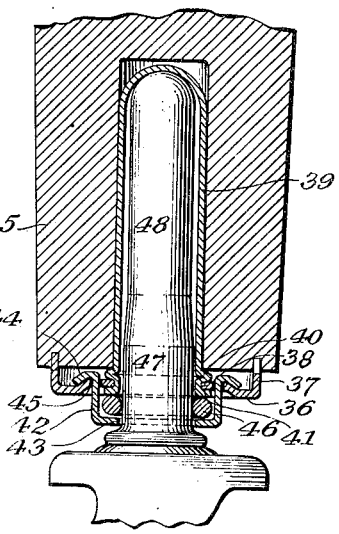
Fig. 13 is a vertical sectional view, showing the same attached to the leg, and with the caster pintle inserted.
Figure 14:
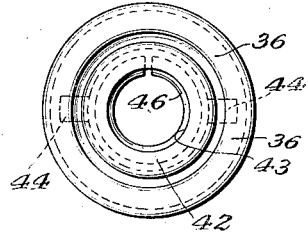
Fig. 14 is a bottom plan view of the caster socket shown in Fig. 12.

In Figs. 12 to 14 I have illustrated a modified form of the invention embodied in a caster socket adapted for insertion in a wood furniture leg 35, and consisting of a base member 36 having a serrated peripheral flange 37 adapted to be driven into the leg, as shown in Fig. 13, said member being provided with a central aperture 38 within which is attached the lower end of the tubular socket member 39 by flanging and crimping, as at 40 and 41, this socket being dome shaped at its upper end and adapted to be inserted in a hole bored into the leg to form a thrust bearing for the caster pintle.

At the under side of the base member there is provided a cup shaped spring ring retaining member 42, centrally apertured, as at 43, for insertion of the caster pintle, and secured by upwardly extending ears 44 inserted through slots 45 in the base member and bent over upon its upper surface. The split spring ring 46 is retained and loosely supported within the cup member in a similar manner to the first embodiment, its inner diameter being smaller than the pintle receiving opening 43 and adapted to grip upon the enlarged lower end portion 47 of the pintle 48, the upper portion of which is of smaller diameter than the inner diameter of the ring.

Figure 15:
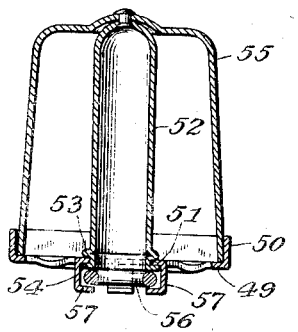
Fig. 15 is a vertical sectional view of another modified form adapted for use with a tubular metal leg of square cross section.
Figure 16:
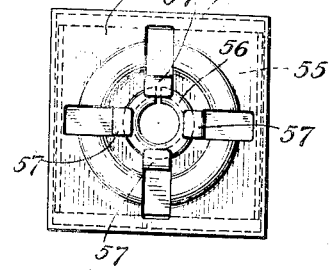
Fig. 16 is a bottom plan view thereof.

In Figs. 15 and 16 I have illustrated another modified form of caster mounting socket adapted for use with a square tubular leg, and consisting of a square leg mount member 49 having a peripheral flange 50, and centrally apertured, as at 51, for attachment of the tubular socket member 52 by flanging and crimping, as at 53 and 54. To the upper end of the socket member there is riveted an inverted U-shape spring frame member 55 having the lower ends of its outwardly flared legs engaged and retained within the flange 50 of the leg mount. The pintle retaining split spring ring 56 is retained at the lower side of the leg mount by a series of radially disposed prongs 57 lanced out of the metal of the leg mount and bent downwardly and inwardly into retaining relation.

Figure 17:
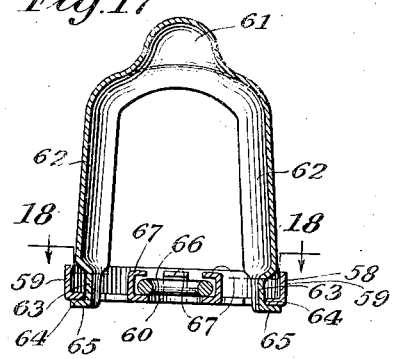
Fig. 17 is a vertical sectional view of still another modified form, adapted for use with a tubular metal leg of circular cross section.
Figure 18:
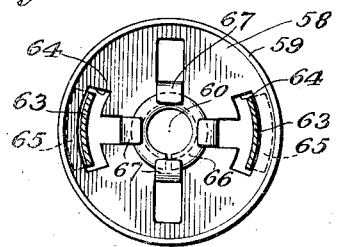
Fig. 18 is a sectional plan view thereof, taken along the line 18—18 of Fig. 17.

In Figs. 17 and 18 there is illustrated a still further modified form for use in a cylindrical tubular leg, and consisting of a circular leg mount member 58 having a peripheral flange 59, and centrally apertured, as at 60, for insertion of the caster pintle. A spring frame member consisting of an upper domed thrust bearing portion 61 for receiving the thrust of the caster pintle and spring legs 62 is attached to the leg mount by inserting the reduced lower portions 63 of the spring legs through slots 64 in the leg mount and engaging the laterally bent end flanges 65 upon the under surface thereof outwardly of said slots 64, this spring frame functioning in a substantially similar manner to that of the first described form.

The pintle retaining split spring ring 66 is retained at the upper side of the leg mount by a series of radially disposed prongs 67 lanced out of the metal of the leg mount and bent upwardly and inwardly into retaining relation.

It will be obvious that my improved pintle holding means may be embodied in various types of caster mounting sockets, and that the invention is adapted not only for the attachment of casters, but of slides and other floor engaging supports adapted to be engaged with a socket by a pintle.

I have illustrated and described preferred and satisfactory embodiments of the invention, but it will be obvious that changes may be made therein, within the spirit and scope thereof, as defined in the appended claims.

Having thus described my invention, what I claim and desire to secure by Letters Patent is:—

1. In a support, a floor engaging element including a pintle, an apertured spring retaining base adapted to be secured to a furniture leg or the like, and including a circumferential lateral confining portion and an axial confining portion constituting an annular pocket, and a spring ring loosely retained in said pocket, said ring adapted to grip said pintle and being rotatable therewith with respect to said base, the apertures of said base above and below said spring ring being of equal diameter and constituting pintle-bearing portions.

2. In a support, a floor engaging element including a pintle, a pintle receiving element adapted to be secured to a furniture leg or the like and including a top pintle-bearing portion and longitudinal spring leg side portions adapted to be spaced below said top pintle-bearing portion with respect to said pintle, and to be contracted and expanded for frictional engagement with said furniture leg, an apertured spring retaining base constituting a bottom pintle-bearing and including a circumferential lateral confining portion and an axial confining portion constituting an annular pocket, and a spring ring retained in said pocket, said ring adapted to grip said pintle and being rotatable therewith with respect to said base.

3. In a support, a floor engaging element including a pintle, a sheet metal pintle receiving element adapted to be secured to a furniture leg or the like, an apertured sheet metal base secured to said pintle receiving element, a spring element carried by said base adapted to frictionally engage said pintle, a sheet metal spring retaining element adapted to be secured to said base, after assembly, including portions adapted to confine said spring element laterally and axially, and permitting the assembly of said spring element with said base in its normal unsprung relation, said spring element being rotatable with said pintle with respect to said pintle receiving element.

4. In a support, a floor engaging element including a pintle, a sheet metal pintle receiving element adapted to be secured to a furniture leg or the like, an apertured sheet metal base secured to said pintle receiving element, a spring element carried by said base adapted to frictionally engage said pintle, a sheet metal centrally apertured cup-shaped spring retaining element adapted to be secured to said base, after assembly, including an annular circumferential portion adapted to confine said spring element laterally and an annular flange portion adapted to confine said spring element axially, said spring element being rotatable with said pintle with respect to said pintle receiving element.

5. In a support, the combination of a holding ring to provide a retaining pocket for a spring ring, an annular spring ring adapted to be retained therein, and a leg engaging element secured to said holding ring, said holding ring and said leg engaging element being assembled by relative movement in axial direction.

6. In a support, the combination of an annular spring ring, retaining means therefor comprising two pocket forming ring elements adapted to be assembled axially with the spring contained in the pocket formed thereby, one of said ring elements additionally serving as leg engaging means.

7. In a support, the combination with a spring element adapted to engage a pintle, of means for engaging a furniture leg or the like, and for retaining said spring element, said means comprising two annular holding elements adapted to be assembled in the axial direction of the pintle with the spring element contained in the pocket formed thereby.

8. In a support, the combination of an apertured base containing a pocket for a spring element, a pintle retaining spring element contained in said pocket, and a resilient metal member secured to said base, adapted to be forced into an opening in a furniture leg, and carrying a portion adapted to form a top bearing for a pintle inserted through the aperture in said base, said member having a leg-engaging portion of greater diameter than said top bearing portion and an arched portion connecting said top bearing portion with said leg engaging portion.

Signed at Bridgeport, in the county of Fairfield, and State of Connecticut, this 25th day of November, 1925.

WALTER F. HEROLD.